US008670380B2

(12) United States Patent
Green, III et al.

(10) Patent No.: US 8,670,380 B2
(45) Date of Patent: Mar. 11, 2014

(54) DISTRIBUTED RECEPTION WIRELESS MICROPHONE SYSTEM

(75) Inventors: Robert T. Green, III, Streetsboro, OH (US); Brian Fair, Boyds, MD (US)

(73) Assignee: Audio Technica, U.S., Inc, Stow, OH (US)

( * ) Notice: Subject to any disclaimer, the term of this patent is extended or adjusted under 35 U.S.C. 154(b) by 786 days.

(21) Appl. No.: 12/904,750

(22) Filed: Oct. 14, 2010

(65) Prior Publication Data

US 2011/0299457 A1 Dec. 8, 2011

Related U.S. Application Data (60) Provisional application No. 61/352,507, filed on Jun. 8, 2010.

(51) Int. Cl.
*H04W 80/04* (2009.01)

(52) U.S. Cl.
USPC ........... 370/328; 370/329; 370/330; 370/337; 370/338; 370/339; 455/217; 455/219; 455/225; 455/551; 455/560

(58) Field of Classification Search
USPC ................. 370/338, 337, 339, 328, 329, 330; 455/517, 219, 225, 551, 560
See application file for complete search history.

(56) References Cited

U.S. PATENT DOCUMENTS

| 2002/0197957 | A1* | 12/2002 | Kawasaki et al. ............... 455/42 |
| 2003/0087667 | A1* | 5/2003 | Taniguchi et al. ............ 455/556 |
| 2005/0197061 | A1* | 9/2005 | Hundal ........................ 455/41.2 |
| 2007/0274550 | A1* | 11/2007 | Baechler et al. .............. 381/315 |
| 2008/0207265 | A1* | 8/2008 | Chung .......................... 455/557 |
| 2009/0086619 | A1* | 4/2009 | Santhoff et al. .............. 370/208 |

* cited by examiner

*Primary Examiner* — Brandon Renner
*Assistant Examiner* — Abdelnabi Musa
(74) *Attorney, Agent, or Firm* — Husch Blackwell LLP (57) ABSTRACT

An apparatus is provided that includes a plurality of portable wireless transmitter units, a plurality of digital receiver modules that alternate transmitting wireless synchronization pulses and that receive information from the plurality of transmitter units synchronized to the synchronization pulses, a receiver control unit in communication with each of the receiver modules that coordinates transmission of synchronization pulses among the plurality of digital receiver modules in accordance with a predetermined transmission sequence and a system that receives the information from at least some of the microphone transmitter units through the receiver modules and delivers the information exclusively to a geographic area proximate a source of the audio information.

21 Claims, 5 Drawing Sheets

DRM 1
DRM 2

4 ON
4 OFF

Fig. 3B

DRM 1
DRM 2
DRM 3

4 ON
8 OFF

Fig. 3C

DRM 1
DRM 2
DRM 3
DRM 4

4 ON
12 OFF

DISTRIBUTED RECEPTION WIRELESS MICROPHONE SYSTEM

This application is a continuation-in-part of U.S. Provisional Patent Application No. 61/352,507 filed on Jun. 8, 2010 (pending), incorporated herein by reference.

FIELD OF THE INVENTION

The field of the invention relates to public address and more particularly to wireless microphone systems.

BACKGROUND OF THE INVENTION

Public address systems for public speaking events are well known. Typically, a person at a podium addresses a crowd through a microphone of a public address system. The voice of the person is detected by the microphone, amplified with an amplifier and the amplified sound is directed to the crowd through one or more speakers.

In more sophisticated systems, the microphone may be a wireless device. In this case, a wireless transmitter may be incorporated into the microphone. A corresponding wireless receiver may receive an audio signal from the transmitter and couple the audio signal to the speakers through the amplifier.

Wireless microphones have a distinct advantage over wired microphones because of the mobility provided. However, wireless microphones typically operate on unlicensed frequency bands that limit the available power and range of such devices.

Because of the flexibility, wireless microphones have become a necessary component in many public proceedings involving many different speakers. In such cases, each wireless microphone is provided with its own transmitter and receiver and each operating on its own frequency under a format known as Frequency Division Multiple Access (FDMA).

While wireless microphones work well, they have a number of features that make them difficult to use in many applications. For example, because of the limited output power, wireless microphones typically operate with a range of less than 100 meters. The limited range is reduced when a speaker places his own body between the wireless microphone transmitter and receiver. In addition, the limited number of frequencies requires that adjacent wireless microphones typically operate on the same or very close frequency ranges, often causing mutual interferences among wireless devices. Because of the importance of wireless microphones, a need exists for better ways of using more wireless microphones in close proximity.

DETAILED DESCRIPTION OF AN ILLUSTRATED EMBODIMENT

Figure 1:
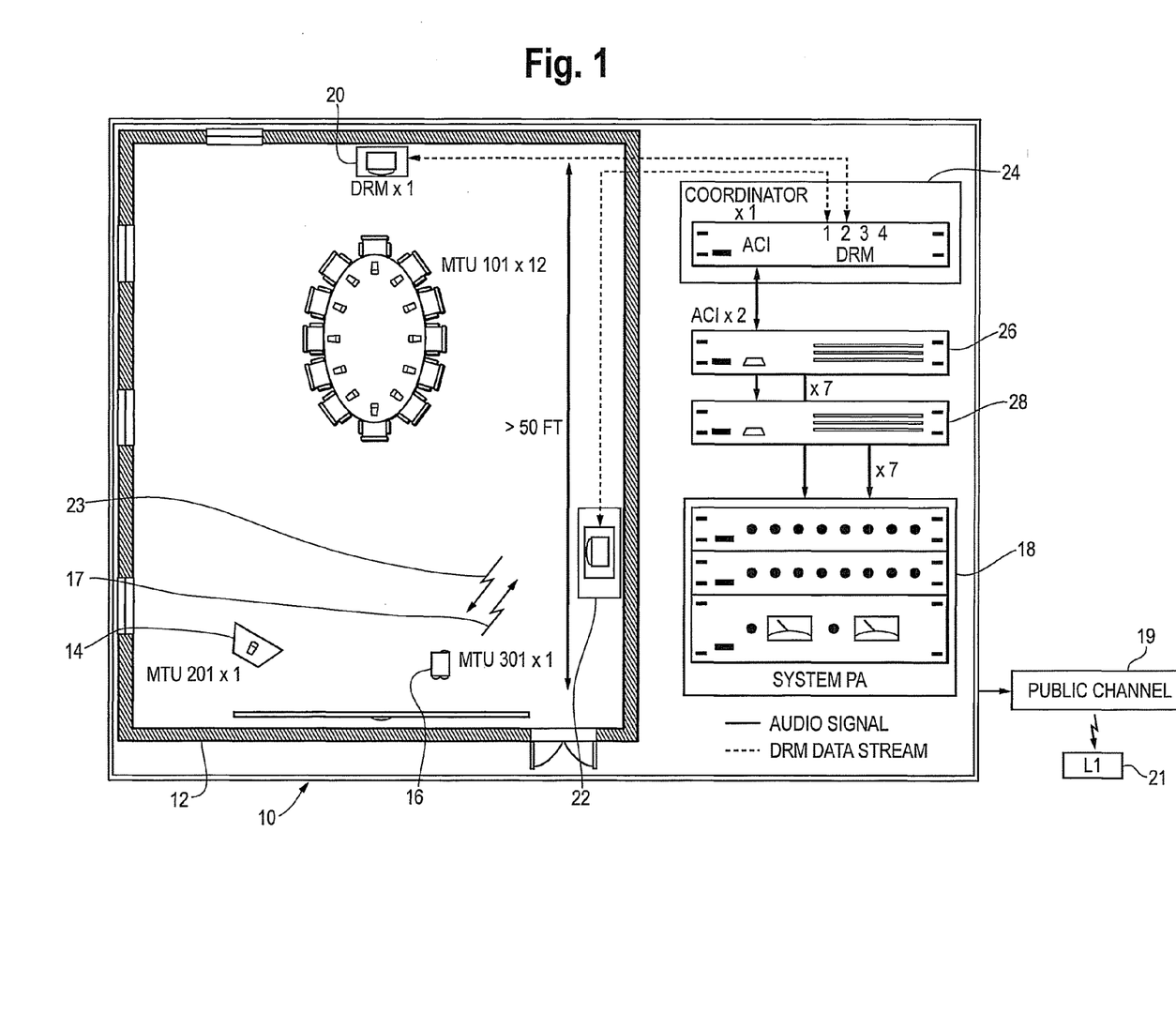
FIG. 1 is a plan view of a wires microphone system in accordance with an illustrated embodiment of the invention.

FIG. 1 depicts a distributed reception wireless system 10 shown generally in accordance with an illustrated embodiment of the invention. The wireless system 10 may be used for routing information from portable wireless transceivers to a predetermined destination in any of a number of different applications (e.g., wireless microphones, digitally based GPS systems, etc.).

Under one particular embodiment, the wireless microphone system 10 may be used to detect audio information within an area 12 through one or more wireless microphone transmitter units (MTUs) 14, 16, to amplify the audio information within a public address (PA) system 18 and to deliver the amplified audio information back into the area 12 through a local set of loudspeakers.

Alternatively, the amplified audio information may be distributed to a number of remote listeners 21. For example, the system 10 may be used to monitor a public proceeding and to deliver the amplified audio over a public communication channel (e.g., radio, television, cable, etc.) 19. Accordingly, the system 10 may be more properly described in some embodiments as intended for entertainment, communication or announcement audio.

Included within the area 12 may be a number of digital receiver modules (DRMs) 20, 22. The digital receiver modules 20, 22 may be coupled to the PA system 18 through a receiver control unit 24 and one or more audio control interfaces (ACIs) 26, 28.

The microphone transmitter units 14, 16 and digital receiver modules 20, 22 of the system 10 may exchange information over the wireless interface under a time division multiple access (TDMA) format. A repeating data frame under the TDMA format may be defined by a synchronization pulse followed by a number of slots (e.g., 14) in which the microphone transmitter units 14, 16 may transmit audio information.

In order to maintain synchronization within the system 10, the digital receiver modules 20, 22 may each transmit synchronization pulses 23 at some appropriate time interval (e.g., once every one millisecond) for the benefit of the microphone transmitter units 14, 16. In response, each of the microphone transmitter units 14, 16 may transmit audio information pulses 17 within a respective assigned slot.

The transceivers of the microphone transmitter units 14, 16 and digital receiver modules 20, 22 may operate under an ultrawideband (UWB) format. The synchronization pulses 23 and audio information pulses 17 may have a similar structure including an appropriate center frequency (e.g., 6.350 GHz), frequency range (e.g., 6.100 GHz to 6.600 GHz) and pulse duration (e.g., 3 nanoseconds).

The microphone transmitter units 14, 16 may each include a transmitter, a receiver, a microphone and a central processing unit (CPU) with non-volatile memory. The CPU may include one or more processors including a synchronization processor that monitors for and detects synchronization pulses from the digital receiver modules 20, 22.

A synchronization clocking processor within the microphone transmitter units 14, 16 may be synchronized with synchronization pulses received at regular intervals. A separate counter may be used to count the number of missed synchronization pulses using a windowing function and to deactivate the transmitter after a predetermined number (sequence) of missing synchronization pulses.

Included within each microphone transmitter unit 14, 16 may be a transmission processor that synchronizes the transmission of audio information pulses with the received synchronization pulses. In this case, a predetermined slot identifier saved within the memory of or programmed into the microphone transmitter units 14, 16 identifies a slot location for transmission of the audio information pulses.

An audio information processor within each of the microphone transmitter units 14, 16 may receive audio information from a microphone, retrieve an identifier of the microphone transmitter unit 14, 16 from memory and incorporate the audio information and identifier into an audio information packet. A transmission processor receives the audio packet and transmits the packet as an audio information pulse aligned within the identified slot.

The microphone transmitter units 14, 16 may also incorporate forward error correction (e.g., under a Reed-Solomon format). In this case, a forward error correction processor may also incorporate forward error correction data into each transmitted audio packet.

The synchronization pulses transmitted by each of the digital receiver modules 20, 22 are controlled by a processor within the receiver control unit 24. A pulse control processor within the receiver control unit 24 may send an instruction to a digital receiver module 20, 22 each time a pulse is to be transmitted or the pulses may be automatically generated by a pulse processor within each digital receiver module 20, 22 under control of the receiver control unit 24. In either case, the pulse control processor of the receiver control unit 24 may retrieve predetermined pulse sequences from a set of pulse sequence files located within a non-volatile memory of the receiver control unit 24. The pulse sequence file and pulse sequence may be selected based upon the number of digital receiver modules 20 operating within the system 10.

Under one illustrated embodiment of the invention, the digital receiver modules 20, 22 and receiver control unit 24 perform a synchronization routine during initialization to calculate and compensate for delays associated with cable length. The delays are associated with differences in cable length between each digital receiver module 20, 22 and the receiver control unit 24. By determining the delays, a cable compensation adjustment is calculated for the synchronization pulse transmitted by each digital receiver module 20, 22.

In this regard, the receiver control unit 24 may transmit a signal to each of the digital receiver modules 20, 22 that is immediately returned with only a minimum, predetermined processing time delay within each digital receiver module 20, 22. The receiver control unit 24 divides the round trip delay in half to calculate the time delay for that digital receiver module 20, 22. The receiver control unit 24 then advances any timing signals to the digital receiver module 20, 22 based upon that calculated time delay. The receiver control unit 24 performs this calculation to ensure that synchronization signals transmitted to the microphone transmitter units 14, 16 by the digital receiver modules 20, 22 are in synchronism (i.e., phase alignment) even though data returned to the receiver control unit 24 by the digital receiver modules 20, 22 may not be in synchronism (i.e., phase alignment).

The cable compensation may be necessary due to the precision required in the timing of the signals. All elements of the system must operate within a very specific window in order for the communication to be free from errors. In the use of multiple DRMs, each one shares the responsibility for generating the synchronization signal required to handle and assure the correct timing of all components in a round robin fashion. The cable compensation is required so that the timing signal will be generated by each DRM within the very narrow timing window required. At the same time all DRMs are receiving data from the MTU units and passing them on. Without the cable compensation the data packets sent by the DRMs may end up in the wrong frame again causing errors and loss of link.

Figure 3A:
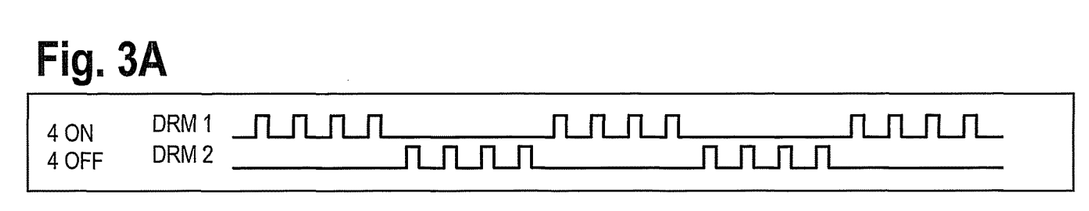
FIG. 3 is a timing diagram of synchronization pulse sequences that may be used by the system of FIG. 1.
Figure 3B:
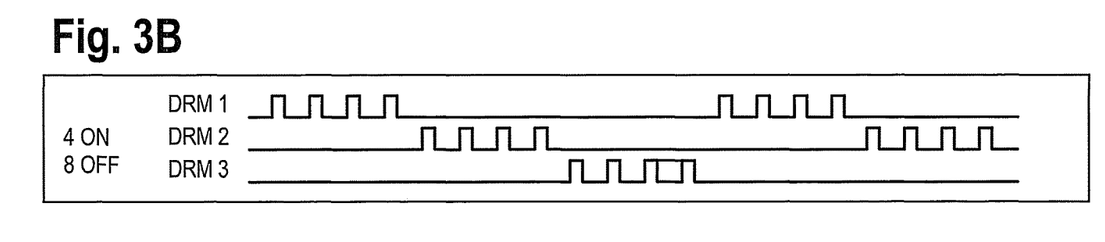

The synchronization pulses transmitted by each of the digital receiver modules 20, 22 may be combined and incorporated into a multiframe sequence of synchronization pulses (i.e., a superframe) under control of the receiver control unit 24 as shown in FIG. 3A. As shown in FIG. 3, no two digital receiver modules 20, 22 transmit synchronization pulses simultaneously.

Under one embodiment, as shown in FIG. 3A, the system 10 may operate under an 8 frame long superframe. As shown, a first digital receiver module 20 may transmit 4 synchronization pulses one ms apart for 4 ms followed by the second digital receiver module 22 transmitting another 4 synchronization pulses one ms apart for 4 ms, after which, the process repeats. Each synchronization pulse defines a portion (i.e., a frame) of the 8 frame superframe.

Following a synchronization pulse, the microphone transmitting units 14, 16 may transmit audio information within the predefined slot of the frame that is defined by the synchronization pulse. For example, if the first microphone transmitting unit 14 were assigned to the first slot, then the first microphone transmitting unit 14 would always transmit in the first slot after each synchronization pulse. Similarly, if the second microphone transmitting unit 16 were assigned to the eighth slot, then the second microphone transmitting unit 16 would always transmit in the eighth slot.

It should be noted that after each synchronization pulse, a frame processor within each digital receiving module 20, 22 monitors for audio data within each of the respective slots. The information from each of the digital receiving modules 20, 22 may be forwarded to the coordinating module 24 under a TDM format where the information is further processed. Processing in this case may mean that a content processor may retrieve the slot content received from each microphone transmitter units 14, 16 received through each digital receiving module and compare the slot content with the corresponding slot content received from the other digital receiving module. The receiver control unit 24 will compare the slot content from each microphone transmitter unit 14, 16, and it must choose which content to pass on in the aggregated audio stream. It may do this by checking for errors in the slot content and by comparing the content to the content of the other each microphone transmitter units 14, 16. In this regard, the receiver control unit 24 may dynamically select the digital receiver module 20, 22 providing the audio packets with the smallest number of errors for each MTU 14, 16 as the signal source for that MTU 14, 16.

In this example, the content processor of the receiver control unit 24 would forward a single stream of audio data from the microphone transmitter units 14, 16 to the audio control interface 26, 28. A demultiplexing processor within the audio control interface 26, 28, in turn, recognizes and retrieves the contribution (i.e., the audio signal) from each microphone transmitter unit 14, 16 received through the selected digital receiver module 20, 22. The audio control interface 26, 28, in turn, routes the audio signal from each microphone transmitting unit 14, 16 to a respective input of the PA system 18.

Alternatively, data detected within the respective slots may be packetized within the respective digital receiving modules 20, 22 and forwarded to the receiving control unit 24. Within the receiver control unit 24, an audio processor may compare error rates from each digital receiver and select the receiver 20, 22 (and packet) having the least errors.

Figure 2:
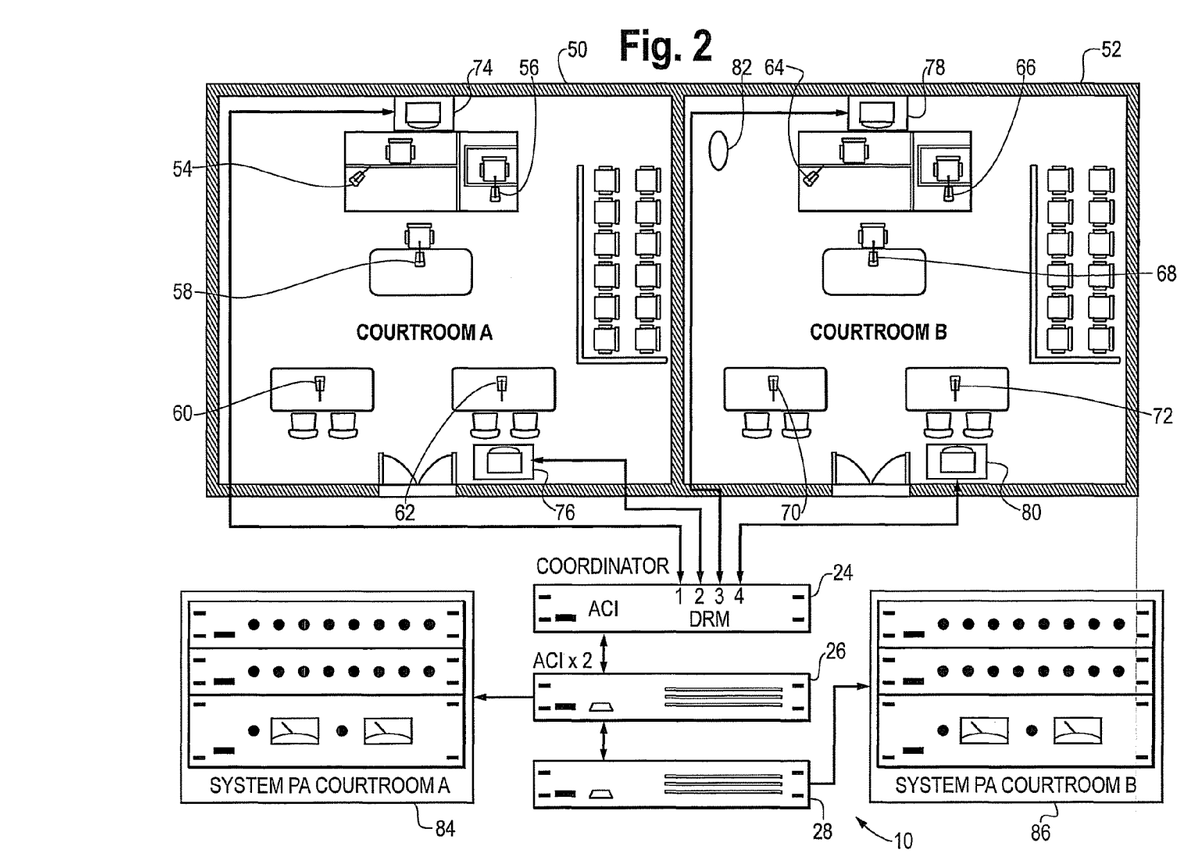
FIG. 2 is a plan view of a wireless microphone system in accordance with an alternate embodiment of the illustrated embodiment.

FIG. 2 depicts the system 10 in an alternate embodiment. As shown in FIG. 2, the system 10 operates in two areas 50,

52. A first set of microphone transmitter units 54, 56, 58, 60, 62 are assigned to the first area 50 and a second set of microphone transmitter units 64, 66, 68, 70, 72 are assigned to the second area 52. Under one embodiment, the system 10 identifies the microphone transmitter unit 14, 16 via the slot in which the unit 14, 16 is transmitting. Under this embodiment, each of the microphone transmitter units 54, 56, 58, 60, 62, 64, 66, 68, 70, 72 may be provided with a selector switch through which a group slot may be identified. In this regard, the first group of microphone transmitter units 56, 58, 60, 62 may each be assigned, respectively, to slots 1-4 and the second group of microphone transmitter units 64, 66, 68, 70, 72 may be assigned, respectively, to slots 5-9.

Alternatively, each of the microphone transmitting units 54, 56, 58, 60, 62, 64, 66, 68, 70, 72 may or may not be provided with a unique address that identifies the microphone transmitting unit according to its area 50, 52 of registration. In addition, each of the set of microphone transmitter units 54 may include a group identifier incorporated into the unique identifier of each microphone transmitter unit.

As shown in FIG. 2, the first area 50 includes a first and second digital receiving unit 74, 76. Similarly, the second area 52 includes a first and second digital receiving unit 78, 80.

Figure 3C:
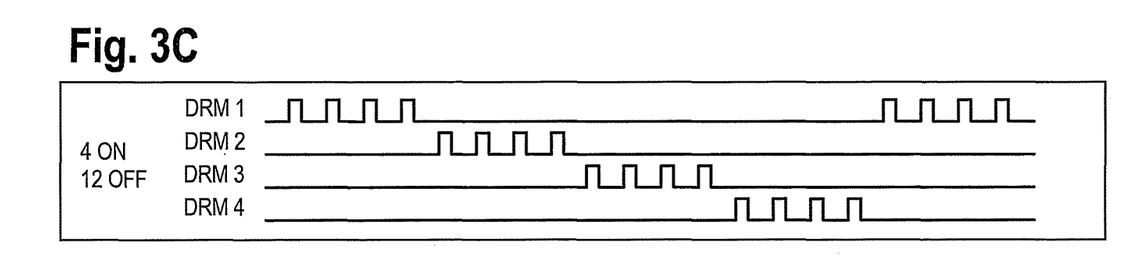

In the embodiment of FIG. 2, the coordinating module 24 may also define a synchronization pulse sequence for each of the digital receiving modules 74, 76, 78, 80. One possible transmission sequence among the 4 digital receiving modules 74, 76, 78, 80 is shown in FIG. 3C. As shown in FIG. 3C, a first digital receiving module 74 may transmit a first pulse sequence of four synchronization pulses, a second digital receiving module 76 may transmit a second sequence of four synchronization pulses immediately after the first and the third and fourth digital receiving modules 78, 80 may subsequently transmit third and fourth sequences including a respective set of first four synchronization pulses after that.

After each synchronization pulse of FIG. 3C, each of the digital receiving modules 74, 76, 78, 80 may monitor for transmissions from each of the microphone transmitting units 54, 56, 58, 60, 62, 64, 66, 68, 70, 72. Any received audio packets from a microphone transmitting unit is packetized by the respective digital receiving module 74, 76, 78, 80 along with its unique identifier (determined from the transmitting slot or recovered from the audio packet) and forwarded to the coordinating module 24.

Within the receiver control unit, the packets are compared to identify the best possible audio signal from each microphone transmitting unit (e.g., based upon transmission errors). The coordinating module 24 may also identify and forward the packets based upon the unique identifier (or slot) assigned to each microphone transmitting unit 54, 56, 58, 60, 62, 64, 66, 68, 70, 72.

In this case, audio packets from microphone transmitting units assigned to the first area 50 are forwarded to a first PA system 84 and audio packets from microphone transmitting units assigned to the second area 52 are forwarded to a second PA system 86. In each case, the coordinating module 24 forwards the audio packets to the audio control interfaces 26, 28 where a source address (or slot) of each packet is retrieved and compared with the list of microphone transmitting units assigned to each area 50, 52.

The system 10 offers significant advantages over convention audio systems. For example, the transmission of synchronization pulses from a number of different sources reduces or eliminates the possibility that a microphone transmitting unit could be in a location where the unit could not receive a synchronization pulse from any digital receiving module. For similar reasons, the receipt of audio signals by each of the digital receiving modules 74, 76, 78, 80 significantly increases the likelihood that at least one of the digital receiving modules will receive a strong audio signal.

The use of a unique identifier (or slot) with each audio signal allows any digital receiving module to receive an audio signal from any microphone transmitting unit and route the audio signal to the proper PA system 84, 86. This allows an audio signal generated in an area 50, 52 to be amplified and the amplified audio signal delivered only to the area from which the audio signal originated.

It should be understood that the use of the word "only" is intended to mean delivery of the amplified audio signal to an intended area. For example, delivery of audio from a microphone transmitting unit 58 to listeners in area 52 would be a distraction to those listeners. However, delivery of an amplified audio signal from the microphone 58 to a radio listener that wishes to hear a public proceeding in area 50 would be an intended destination even though it would involve delivery of the audio signal to an area different from where the audio signal originated.

The failure of a microphone transmitting unit to detect one or more synchronization pulses does not significantly degrade the slot alignment of transmissions by the microphone transmitting units. In this case, an internal time base of each microphone transmitter unit 14, 16 maintains synchronization to a relatively good degree. However, after some extended period of missed pulses (e.g., 21 missed synchronization pulses in a row), the audio information transmitter portion of the microphone transmitting unit may be automatically deactivated. In this case, a receiver within the microphone transmitting unit may continue to search for and detect synchronization signals. In the event that the receiver detects a set of 4 synchronization pulses in a row, the microphone transmitting unit may again begin transmitting audio information.

In another illustrated embodiment, shown in FIG. 4, the number of synchronization pulses in a sequence from each digital receiver module are increased to improve the chances that a microphone transmitter unit will receive the minimum number of synchronization pulses that are required (e.g., 4 synchronization pulses in 4 ms) to ensure that the microphone transmitter unit is locked into or otherwise achieved synchronism.

Figure 4A:
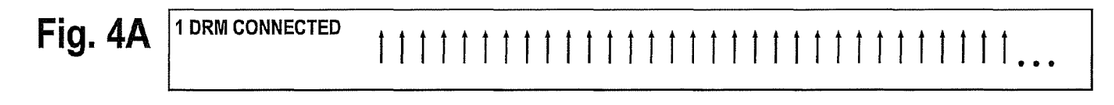
FIGS. 4A-D is an alternate timing diagram of synchronization pulse sequences that may be used by the system of FIG. 1.
Figure 4B:
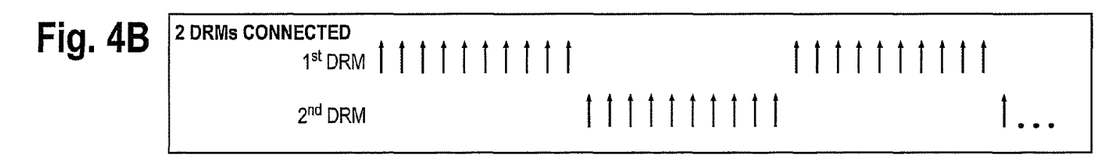

FIG. 4B is an example of the use of two digital receiver modules. In this example, each digital receiver module transmits a sequence of 10 synchronization pulses and is then silent for the next 10 synchronization pulses.

Figure 4C:
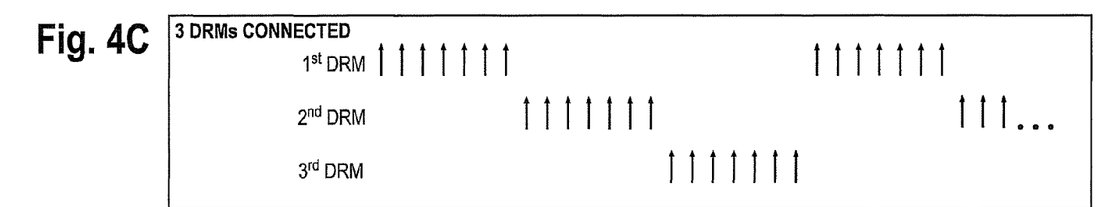

FIG. 4C is an example of three digital receiver modules. In this case, the first digital receiver module transmits a sequence of 7 synchronization pulses. After the first digital receiver module transmits 7 synchronization pulses, the second digital receiver modules transmits a sequence of 7 synchronization pulses followed by the third digital receiver module transmitting a series of 7 synchronization pulses. After 21 synchronization pulses, the process repeats, again starting with the first digital receiver module.

Figure 4D:
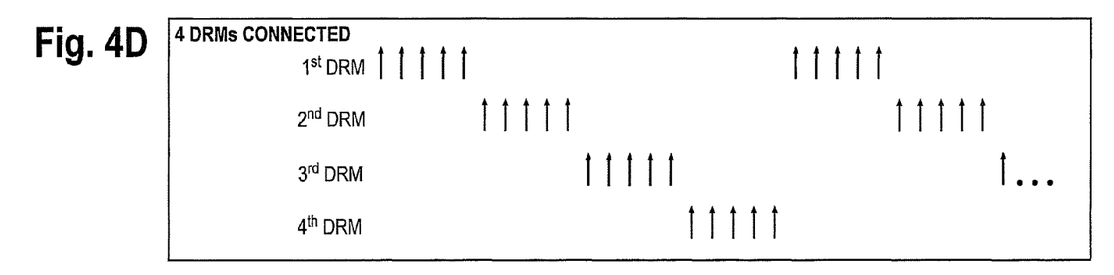

FIG. 4D is an example of four digital receiver modules. In this case, the first digital receiver module transmits a sequence of 5 synchronization pulses. After the first digital receiver module transmits 5 synchronization pulses, the second digital receiver modules transmits a sequence of 5 synchronization pulses followed by the third and fourth digital receiver module transmitting a series of 5 synchronization pulses. After 20 synchronization pulses in this example, the process repeats, again starting with the first digital receiver module.

Figure 5:
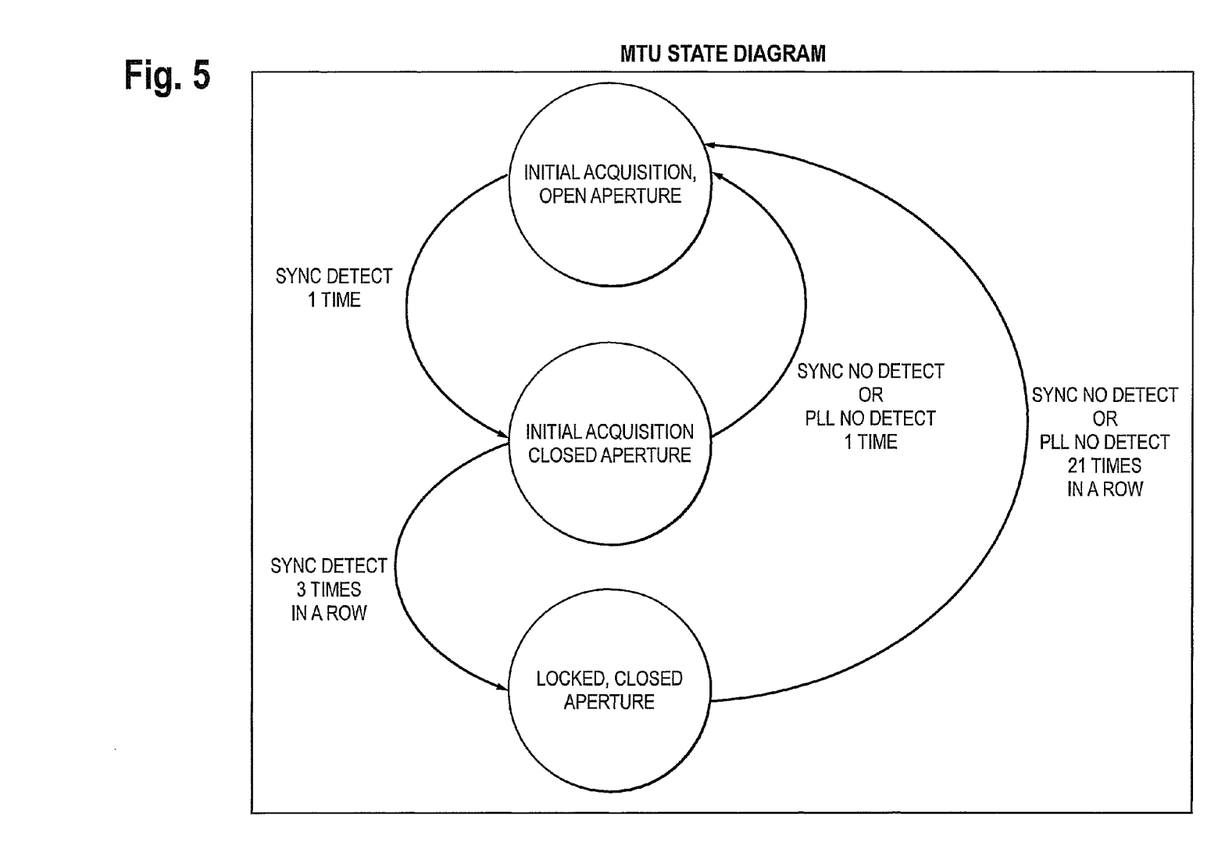
FIG. 5 is a synchronization state diagram of a microphone transmitter unit that may be used with the system of FIG. 1.

FIG. 5 is a sequence diagram of a microphone receiver module. As shown in FIG. 5, the microphone receiver module first assumes an initial acquisition, open aperture state where the microphone transmitter monitors for synchronization pulses. When the microphone transmitter unit detects a sequence of four synchronization pulses 1 ms apart, the microphone transmitter module enters an initial acquisition, closed aperture state. Finally, when the microphone transmitter unit detects a series of four synchronization pulses 1 ms apart three times in a row (i.e., over three multiframes), the microphone transmitter unit enters a locked, closed aperture state.

A specific embodiment of a wireless microphone system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. An apparatus comprising:
    a plurality of portable wireless transmitter units;
    a plurality of digital receiver modules that alternate transmitting wireless synchronization pulses and that receive information from the plurality of portable wireless transmitter units synchronized to the synchronization pulses;
    a receiver control unit in communication with each of the receiver modules that coordinates transmission of synchronization pulses among the plurality of digital receiver modules in accordance with a predetermined transmission sequence; and
    a system that receives the information from at least some of the transmitter units through the receiver modules and delivers the information exclusively to an intended predetermined destination wherein each of the plurality of portable transmitter units operate under a common time division multiple access (TDMA) format within a repeating frame defined by the alternating wireless synchronization pulses from each of the plurality of digital receiver modules, wherein each of the plurality of portable transmitter units is assigned to a respective slot of the repeating frame, wherein the receiver control unit receives audio packets within the respective assigned slot from each of the plurality of portable transmitter units through each of the plurality of digital receiver modules and dynamically selects the digital receiver module providing audio packets with the smallest relative number of errors by comparing a bit error rate through each of the plurality of digital receiver modules from each of the plurality of portable transmitter units.

2. The apparatus as in claim 1 wherein the portable transmitters further comprise wireless microphones.

3. The apparatus as in claim 1 wherein the information further comprises audio.

4. The apparatus as in claim 1 wherein the system further comprises an entertainment, communication or announcement audio system.

5. The apparatus as in claim 2 wherein the plurality of microphone transmitter units and digital receiver modules operate under a ultrawideband format.

6. The apparatus as in claim 1 wherein the plurality of digital receiver modules alternatively transmit a sequence of synchronization pulses.

7. The apparatus as in claim 1 wherein the synchronization pulses are approximately 1 millisecond apart.

8. The apparatus as in claim 1 wherein the synchronization pulses define a time division multiple access frame.

9. The apparatus as in claim 1 further comprising a plurality of geographic areas where at least a first group of the plurality of microphone transmitter units are assigned to a first geographic area of the plurality of geographic areas and a second group of the plurality of microphone transmitter units are assigned to a second geographic area of the plurality of geographic areas.

10. An apparatus comprising:
    a plurality of geographic areas;
    a plurality of portable wireless microphone transmitter units with a first group of the plurality of microphone transmitter units assigned to a first geographic area of the plurality of geographic areas and a second group of the plurality of microphone transmitter units assigned to a second geographic area of the plurality of geographic areas;
    a plurality of digital receiver modules with a first group of the plurality of digital receiver modules assigned to the first geographic area of the plurality of geographic areas and a second group of the plurality of digital receiver modules assigned to the second geographic area of the plurality of geographic areas and where the plurality of digital receiver modules alternate transmitting wireless synchronization pulses and that receive audio information from the plurality of microphone transmitter units synchronized to the synchronization pulses;
    a receiver control unit in communication with each of the receiver modules that coordinates transmission of synchronization pulses among the plurality of digital receiver modules in accordance with a predetermined transmission sequence; and
    a plurality of entertainment, communication or announcement audio systems that receives the audio information from at least some of the microphone transmitter units through the receiver modules, amplifies the audio information and delivers the amplified audio information exclusively to an intended area wherein each of the plurality of portable wireless microphone transmitter units operate under a common time division multiple access (TDM) format within a repeating frame defined by the alternating wireless synchronization pulses from each of the plurality of digital receiver modules, wherein each of the plurality of portable wireless microphone transmitter units is assigned to a respective slot of the repeating frame, wherein the receiver control unit receives audio packets within the respective assigned slot from each of the plurality of portable wireless microphone transmitter units through each of the plurality of digital receiver modules and dynamically selects the digital receiver module providing audio packets with the smallest relative number of errors by comparing a bit error rate through each of the plurality of digital receiver modules from each of the plurality of portable wireless microphone transmitter units.

11. The apparatus as in claim 10 wherein the receiver control unit selects a digital receiver module of the plurality of digital receiver modules for receiving audio information for each of the plurality of portable wireless transmitters based upon an error rate detected through the digital receiver module.

12. The apparatus as in claim 10 wherein the plurality of digital receiver modules alternatively transmit a sequence of synchronization pulses.

13. The apparatus as in claim 10 wherein the synchronization pulses are approximately 1 millisecond apart.

14. The apparatus as in claim 10 wherein the synchronization pulses define a time division multiple access frame.

15. An apparatus comprising:
 a plurality of portable wireless microphone transmitter units, each with a group identifier;
 a plurality of digital receiver modules that alternate transmitting wireless synchronization pulses and that receive audio information from the plurality of microphone transmitter units synchronized to the synchronization pulses;
 a receiver control unit in communication with each of the receiver modules that coordinates transmission of synchronization pulses among the plurality of digital receiver modules in accordance with a predetermined transmission sequence; and
 a public address system that receives the audio information from at least some of the microphone transmitter units through the receiver modules, amplifies the audio information and delivers the amplified audio information exclusively to a destination identified by the group identifier of the source wherein each of the plurality of portable wireless microphone transmitter units operate under a common time division multiple access (TDMA) format within a repeating frame defined by the alternating wireless synchronization pulses from each of the plurality of digital receiver modules, wherein each of the plurality of portable wireless microphone transmitter units is assigned to a respective slot of the repeating frame, wherein the receiver control unit receives audio packets within the respective assigned slot from each of the plurality of portable wireless microphone transmitter units through each of the plurality of digital receiver modules and dynamically selects the digital receiver module providing audio packets with the smallest relative number of errors by comparing a bit error rate through each of the plurality of digital receiver modules from each of the plurality of portable transmitter units.

16. The apparatus as in claim 15 wherein the receiver control unit selects a digital receiver module of the plurality of digital receiver modules for receiving audio information for each of the plurality of portable wireless transmitters based upon an error rate detected through the digital receiver module.

17. The apparatus as in claim 15 wherein the receiver control unit dynamically selects a digital receiver module of the plurality of digital receiver modules for receiving audio information for each of the plurality of portable wireless transmitters based upon an error rate of the portable wireless transmitter detected through the digital receiver module.

18. The apparatus as in claim 15 wherein the plurality of digital receiver modules alternatively transmit a sequence of synchronization pulses.

19. The apparatus as in claim 15 wherein the synchronization pulses are approximately 1 millisecond apart.

20. The apparatus as in claim 15 wherein the synchronization pulses define a time division multiple access frame.

21. The apparatus as in claim 1 wherein the plurality of digital receiver modules further comprise a cable compensation delay used to synchronize the transmission of the synchronization pulses based upon a cable length connecting the respective digital receiver modules to the receiver control unit.

* * * * *